(12) United States Patent
Pecorini et al.

(10) Patent No.: US 8,604,138 B2
(45) Date of Patent: *Dec. 10, 2013

(54) EXTRUSION BLOW MOLDED ARTICLES

(75) Inventors: Thomas Joseph Pecorini, Kingsport, TN (US); Spencer Allen Gilliam, Kingsport, TN (US); Ignacio Garcia, Kingsport, TN (US); Alan Keith Phillips, Johnson City, TN (US); Robert Ellis McCrary, Kingsport, TN (US); Mark Allan Treece, Jonesborough, TN (US); Daniel Christopher Cobb, Kingsport, TN (US); Harold Eugene Dobbs, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 678 days.

This patent is subject to a terminal disclaimer.

(21) Appl. No.: 12/255,243

(22) Filed: Oct. 21, 2008

(65) Prior Publication Data

US 2009/0181201 A1 Jul. 16, 2009

Related U.S. Application Data

(60) Provisional application No. 61/020,859, filed on Jan. 14, 2008.

(51) Int. Cl.
*C08G 63/00* (2006.01)

(52) U.S. Cl.
USPC .......... 525/437; 264/537; 264/540; 428/36.9; 428/36.91; 428/39.92; 528/272

(58) Field of Classification Search
USPC ........... 264/537, 540; 428/36.9, 36.91, 36.92; 525/437; 528/272
See application file for complete search history.

(56) References Cited

U.S. PATENT DOCUMENTS

| 3,772,405 | A | | 11/1973 | Hamb |
|---|---|---|---|---|
| 4,161,579 | A | | 7/1979 | Edelman et al. |
| 4,219,527 | A | | 8/1980 | Edelman et al. |
| 4,234,708 | A | | 11/1980 | Edelman et al. |
| 4,554,328 | A | | 11/1985 | Sinker et al. |
| 4,554,329 | A | | 11/1985 | Sinker et al. |
| 4,609,721 | A | * | 9/1986 | Kirshenbaum et al. ....... 528/285 |
| 4,983,711 | A | | 1/1991 | Sublett et al. |
| 5,235,027 | A | | 8/1993 | Thiele et al. |
| 5,372,864 | A | | 12/1994 | Weaver et al. |
| 5,384,377 | A | | 1/1995 | Weaver et al. |
| 5,442,036 | A | | 8/1995 | Beavers et al. |
| 5,523,382 | A | | 6/1996 | Beavers et al. |
| 5,654,347 | A | | 8/1997 | Khemani et al. |
| 5,696,176 | A | | 12/1997 | Khemani et al. |
| 6,100,320 | A | | 8/2000 | Cobb et al. |
| 6,632,390 | B1 | | 10/2003 | Shelby et al. |
| 6,808,805 | B2 | | 10/2004 | Shelby et al. |
| 2004/0260054 | A1 | | 12/2004 | Lee et al. |
| 2008/0093777 | A1 | | 4/2008 | Sequeira et al. |
| 2009/0181202 | A1 | | 7/2009 | Pecorini et al. |

FOREIGN PATENT DOCUMENTS

| EP | 1188540 | 3/2002 |
|---|---|---|
| EP | 1918327 | 5/2008 |
| JP | 2003119260 | 4/2003 |
| JP | 2003252969 | 9/2003 |
| JP | 2005154731 | 6/2005 |
| WO | 2007027043 | 3/2007 |

OTHER PUBLICATIONS

Copending U.S. Appl. No. 12/255,245, filed Oct. 21, 2008, Thomas Joseph Pecorini et al.
Copending U.S. Appl. No. 12/255,237, filed Oct. 21, 2008, Thomas Joseph Pecorini et al.
ASTM D1003, Method A, 2007.
ASTM D3418, 2003.
International Search Report for corresponding PCT/US2009/000137, Filed Jan. 9, 2009.
Notification of Transmittal of the International Serach Report and the Written Opinion of the International Searching Authority, or the Declaration for corresponding PCT/US2009/00167, Filed Jan. 9, 2009.
Notification of Transmittal of the International Serach Report and the Written Opinion of the International Searching Authority, or the Declaration for corresponding PCT/US2009/00152, Filed Jan. 9, 2009.
USPTO Office Action dated Aug. 26, 2011 in copending U.S. Appl. No. 12/255,237.
USPTO Office Action dated Nov. 2, 2011 in copending U.S. Appl. No. 12/255,245.
USPTO Office Action dated May 2, 2012 in copending U.S. Appl. No. 12/255,245.
USPTO Office Action dated Feb. 24, 2012 in copending U.S. Appl. No. 12/255,237.
USPTO Office Action dated Aug. 2, 2012 in copending U.S. Appl. No. 12/255,237.
USPTO Office Action dated Nov. 28, 2012 for co-pending U.S. Appl. No. 12/255,245.
USPTO Office Action dated Dec. 28, 2012 for co-pending U.S. Appl. No. 12/255,237.

* cited by examiner

*Primary Examiner* — Robert Jones, Jr.
(74) *Attorney, Agent, or Firm* — Betty J. Boshears; Louis N. Moreno

(57) ABSTRACT

Extrusion blow molded (EBM) articles comprising a polyester having a dicarboxylic acid component and a glycol component. The dicarboxylic acid component comprises at least 90 mole % terephthalic acid residues. The glycol component comprises at least 75 mole % ethylene glycol residues and 15 to 25 mole % residues of a difunctional glycol such as, for example, 1,4-cyclohexanedimethanol. Such EBM articles can exhibit reduced haze, reduced sharkskin, and/or increased compatibility in PET recycling.

8 Claims, 1 Drawing Sheet

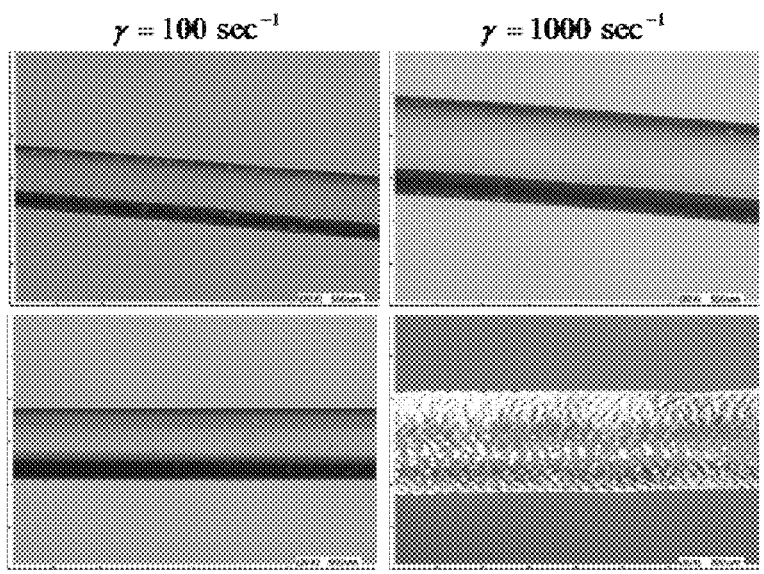

EXTRUSION BLOW MOLDED ARTICLES

CROSS-REFERENCES TO RELATED APPLICATIONS

This application claims the benefit of U.S. Provisional Application Ser. No. 61/020,859 filed on Jan. 14, 2008.

FIELD OF THE INVENTION

The present invention generally relates to polyester compositions made from terephthalic acid, or an ester thereof, or mixtures thereof, and 75 to 85 mole % ethylene glycol that have found to be particularly useful for extrusion blow molding and/or profile extrusion.

BACKGROUND OF THE INVENTION

Consumers value the ability to see the contents of their packages. Consumers also appreciate the toughness and gloss of containers made from polyester. Because of this combination of attributes, containers made from polyethylene terephthalate (PET) produced by the injection stretch blow molding process (ISBM) are the most common type of transparent container on the market. However, the ISBM process is limited to uniform shapes and cannot produce bottles that contain a through-handle. Handles are desirable in larger bottle sizes, where gripping a round or square container becomes cumbersome. Larger size bottles containing a through handle are believed to be produced only by the extrusion blow molding (EBM) process.

A typical extrusion blow-molding manufacturing process involves: 1) melting the resin in an extruder; 2) extruding the molten resin through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

The hot parison that is extruded in this process often must hang for several seconds under its own weight prior to the mold being clamped around it. During this time, the extrudate must have good room dimensional stability, also known as melt strength. Melt strength is directly related to the viscosity of the material at low shear rates, such as 1 $\sec^{-1}$. A material with good melt strength (i.e. high viscosity) can resist stretching and flowing (a.k.a. sag) that would cause uneven material distribution in the parison and thinning of the parison walls. The sag of the extruded parison is directly related to the weight of the parison, whereby larger and heavier parisons will have a greater tendency to sag. Heavier parisons are required as bottle size increases, whereby the production of larger bottles requires higher melt strength. Materials with high melt strength will also resist tearing while the parison is blown into a bottle. Thus, good melt strength is required to form good quality containers, particularly those of larger size, that have uniform side wall thickness and that will not tear during expansion (i.e. blowing).

The two types of extrusion blow molding that involve a hanging parison are referred to as "shuttle" and "intermittent" processes. In a shuttle process, the mold is situated on a moving platform that moves the mold up to the extruder die, closes it around the parison while cutting off a section, and then moves away from the die to inflate, cool and eject the bottle. Due to the mechanics of this process, the polymer is continuously extruded through the die at a relatively slow rate. By contrast, the mold in an intermittent process is fixed below the die opening and the full shot weight (the weight of the bottle plus flash) of polymer must be rapidly pushed through the die after the preceding bottle is ejected but before the current bottle is inflated. Intermittent processes can either utilize a reciprocating screw action to push the parison, or the extrudate can be continuously extruded into a cavity which utilizes a plunger to push the parison.

In a very different type of extrusion blow molding process, a 4-20 ft diameter wheel moving at 1-10 revolutions per minute grabs the parison as it extrudes from the die and lays it in molds attached to the wheel's outer circumference. Mold close, parison inflation, cooling and ejection of the bottle occurs sequentially as the wheel turns. In this "wheel process", the parison is actually pulled from the die by the wheel whereby good melt strength is required to prevent thinning of the parison during both pulling as well as subsequent blowing. The parison in a wheel process can exit the die in either an upward or downward direction and melt strength will be more crucial during upward extrusion due to the effects of gravity. Because of the continuous nature of this "wheel" process, polymer can be extruded from the die at very high speeds.

Unfortunately, extrusion at high speed which sometimes occurs during wheel and intermittent extrusion blow molding processes can create a condition known as "sharkskin" on the surface of the extruded part or article. Sharkskin (a form of melt fracture) is visually observable as a frosty white matte surface haze, and is an undesirable defect in transparent bottles. Sharkskin is a rheological flow instability phenomenon that occurs as molten polymer flows at high shear rates over a metal surface, such as the surface of the extruder die. Shear rates between 100 $\sec^{-1}$ and 1000 $\sec^{-1}$ are typically generated at the die due to the need to obtain reasonably fast production rates while simultaneously generating thin walls for lightweight bottles. Wheel and Intermittent processes create the highest shear rates.

Sharkskin can be avoided by increasing the process melt temperature, which lowers the material's viscosity, but this also leads to a reduction in melt strength. Nonetheless, the shear rate associated with melt strength is typically only around 1 sec−1. Thus, a material with both good melt strength (i.e. high viscosity) at low shear rates and resistance to sharkskin (i.e. low viscosity) at high shear rates is highly desirable for extrusion blow molding. This behavior is referred to as shear thinning.

The typical PET resins used to ISBM beverage containers are believed to be difficult to extrusion blow mold due to their relatively low inherent viscosities (IV≤0.90 dL/g) and high crystalline melting points (>245° C.) which leaves them with low melt strength at the temperatures needed to process them. These ISBM PET resins can be further solid stated to increase viscosity, but these compositions still do not have sufficient shear thinning behavior to prevent sharkskin. Numerous attempts have been made to add branching agents to PET to improve the shear thinning characteristics, but these compositions are believed to require solid stating. Solid stated branched PET compositions are particularly prone to issues with gels and unmelts during the EBM process.

In order to overcome these problems, U.S. Pat. No. 4,983, 711 describes totally amorphous copolyester compositions related to PET that are particularly useful in extrusion blow molding processes. These compositions comprise terephthalic acid or DMT moieties with ethylene glycol and 25-75 mole % 1,4-cyclohexanedimethanol and 0.05 to 1 mole % of a branching agent. These compositions are particularly desirable for extrusion blow molded beverage containers since they yield containers with clarity, gloss and toughness similar to ISBM PET containers.

Unfortunately, containers made from compositions described by U.S. Pat. No. 4,983,711 can cause problems in the PET recycle stream. Ground flake from these containers can stick to the walls of the dryer or agglomerate with PET container flake in a dryer set at 140-180° C. Mixing ground flake from these containers into PET container flake could also result in hazy film, sheet or bottles. It is possible to sort out the compositions described in U.S. Pat. No. 4,983,711 from the PET recycle stream, but a much more desirable solution is to find a material that can be both extrusion blow molded into transparent containers, but will be non-problematic in the PET recycle stream at levels much higher than they will be present in the recycle stream.

In addition, copolyesters of the compositions described in U.S. Pat. No. 4,983,711 can have high levels of sharkskin problems when processed on high output processing equipment such as wheel machines.

Sharkskin can also be a problem in profile extrusion. Profile extrusion is a common, cost-effective method for producing shaped articles. Profiles can take on a wide variety of cross-sections varying in size, shape and complexity. Common "simple" profile shapes include hollow tubes, solid round stock, square cross-section stock, etc. More complex shapes such as those used for pricing channels, corner guards, and house siding can also be made. Profiles are fabricated by melt extrusion processes that begin by extruding a thermoplastic melt through an orifice of a complex die thereby forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention. In either case, the type of thermoplastic resins utilized and its melt strength during formation is critical. For example, when extruded vertically from a die, a polymer with low melt strength will quickly sag and hit the floor; whereas, a polymer with high melt strength will maintain its shape for a much longer amount of time.

Inadequate melt strength results in severe processing problems when polyesters are processed at typical profile extrusion line speeds and temperatures of 390-550° F. (200-290° C.). Process line speeds vary considerably depending on the shape of the profile. Typical speeds for simple shapes like a corner guard may be from 50 to 70 feet (15 to 20 meters) per minute. More complicated shapes may have process line speeds as low as one foot (0.3 meters) per minute, whereas extremely simple shapes with certain types of processing technology may run at speeds as high as 100 feet (30 meters) per minute. At the higher speeds, which obviously would be preferred by profile manufacturers to reduce cost, inadequate melt strength produces an extrudate that does not maintain its shape prior to quenching, and thus deformation occurs. To increase the melt strength of the polyester, processing temperatures are often lowered. This, however, increases the likelihood of sharkskin, which can only be eliminated by lowering the extrusion speed. By decreasing speed, the economic attractiveness of using polyesters is also decreased. Thus, the profile extrusion processes are often operated at maximum speeds associated with the highest temperatures and minimal melt strengths for maintaining particular profile shapes. Any increase in speed or lowering of temperature may cause an increase in high shear viscosity in the die, which then may cause undesirable sharkskin. The die gap thickness in profile extrusion is often 1 mm or less. Shear-stress at the die land in these cases is most often extreme, thus making the onset of sharkskin quite common.

Thus, there is a need in the art for a transparent material with high resistance to sharkskin in extrusion blow molding and profile extrusion processes. It would also be useful to find a material that can be both extrusion blow molded into transparent containers, but that will also be non-problematic in the PET recycle stream.

SUMMARY OF THE INVENTION

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol and neopentyl glycol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms;, and
(b) a glycol component consisting of:
(i) about 75 to about 85 mole % ethylene glycol residues; and
(ii) about 15 to about 25 mole % residues of 1,4-cyclohexanedimethanol;
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol and neopentyl glycol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 75 to about 85 mole % ethylene glycol residues; and
  (ii) about 15 to about 25 mole % residues of 1,4-cyclohexanedimethanol;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:

(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component consisting essentially of:
  (i) about 75 to about 85 mole % ethylene glycol residues; and
  (ii) about 15 to about 25 mole % residues of 1,4-cyclohexanedimethanol; and
  (iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which consists of:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 75 to about 85 mole % ethylene glycol residues; and
  (ii) about 15 to about 25 mole % residues of 1,4-cyclohexanedimethanol; and
  (iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
(b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;

wherein the total mole % of the dicarboxylic acid component is 100 mole %, and
wherein the total mole % of the glycol component is 100 mole %;
wherein the inherent viscosity of the polyester is from 0.50 to 0.95 dL/g as determined ini 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.50 to 0.95 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol and neopentyl glycol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.50 to 0.95 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol;
(c) at least one branching agent in the amount of 0.01 to 1.0 mole %;
wherein the total mole % of the dicarboxylic acid component is 100 mole %,
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.50 to 0.95 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting of:
(i) about 75 to about 85 mole % ethylene glycol residues; and
(ii) about 15 to about 25 mole % residues of 1,4-cyclohexanedimethanol;
(iii) about 2 mole % or less of diethyene glycol residues;
(c) at least one branching agent in the amount of 0.01 to 1.0 mole %;
wherein the total mole % of the dicarboxylic acid component is 100 mole %, and wherein the total mole % of the glycol component is 100 mole %;
wherein the inherent viscosity of the polyester is from 0.50 to 0.95 dL/g as determined in 60/40 (wt/wt) phenol/tetrachloroethane at a concentration of 0.25 g/50 ml at 25° C.; and which has a haze value of less than 5% at shear rates greater than 500 sec$^{-1}$ as measured by ASTM D1003, Method A.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of at least one difunctional glycol chosen from 1,4-cyclohexanedimethanol and neopentyl glycol or mixtures thereof;
 (c) at least one branching agent in the amount of 0.65 to 0.75 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 75 to about 85 mole % ethylene glycol residues; and
  (ii) about 15 to about 25 mole % residues of 1,4-cyclohexanedimethanol;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component consisting essentially of:
  (i) about 75 to about 85 mole % ethylene glycol residues; and
  (ii) about 15 to about 25 mole % residues of 1,4-cyclohexanedimethanol; and
  (iii) about 2 mole % or less of diethyene glycol residues;
 (c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting of:
(i) about 75 to about 85 mole % ethylene glycol residues; and
(ii) about 15 to about 25 mole % residues of 1,4-cyclohexanedimethanol;
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol and neopentyl glycol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;

(ii) about 0 to about 10 mole % of aromatic and/or aliphatic dicarboxylic acid residues having up to 20 carbon atoms; and
(b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which consists of:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol and neopentyl glycol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;

(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol;
(c) at least one branching agent in the amount of 0.01 to 1.0 mole %;
wherein the total mole % of the dicarboxylic acid component is 100 mole %,
wherein the total mole % of the glycol component is 100 mole %; and
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention provides an extrusion blow molded article comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting of:
(i) about 75 to about 85 mole % ethylene glycol residues; and
(ii) about 15 to about 25 mole % residues of 1,4-cyclohexanedimethanol;
(iii) about 2 mole % or less of diethyene glycol residues;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.65 to 0.75 dL/g as determined in 60/40 (wt/wt) phenol/tetrachloroethane at a concentration of 0.25 g/50 ml at 25° C.; and
which has a haze value of less than 5% at shear rates greater than 500 sec$^{-1}$ as measured by ASTM D1003, Method A.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and (ii) about 15 to about 25 mole % residues of at least one difunctional glycol chosen from 1,4-cyclohexanedimethanol and neopentyl glycol or mixtures thereof;

(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 75 to about 85 mole % ethylene glycol residues; and
(ii) about 15 to about 25 mole % residues of 1,4-cyclohexanedimethanol;

(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;

(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention provides comprises at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component consisting of:
(i) about 75 to about 85 mole % ethylene glycol residues; and
(ii) about 15 to about 25 mole % residues of 1,4-cyclohexanedimethanol;
(iii) about 2 mole % or less of diethyene glycol residues;

(c) at least one branching agent in the amount of 0.01 to 1.0 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;

(c) at least one branching agent in the amount of 0.1 to 0.6 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:

(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and (b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; and 2,2,4,4-tetramethyl-1,3-cyclobutanediol or mixtures thereof;

(c) at least one branching agent in the amount of 0.1 to 0.6 mole %;

wherein the total mole % of the dicarboxylic acid component is 100 mole %, and wherein the total mole % of the glycol component is 100 mole %; and wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol and neopentyl glycol or mixtures thereof;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component consisting essentially of:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which consists of:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of 1,4-cyclohexanedimethanol; and
(iii) about 2 mole % or less of diethyene glycol residues;
(c) at least one branching agent in the amount of 0.1 to 0.6 mole %;
wherein the total mole % of the dicarboxylic acid component is 100 mole %, and
wherein the total mole % of the glycol component is 100 mole %; and
wherein the inherent viscosity of the polyester is from 0.50 to 0.95 dL/g as determined in 60/40 (wt/wt) phenol/tetrachloroethane at a concentration of 0.25 g/50 ml at 25° C.

In one aspect, this invention comprises at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 75 to about 85 mole % ethylene glycol residues; and
(ii) about 15 to about 25 mole % residues of at least one difunctional glycol chosen from 1,4-cyclohexanedimethanol, neopentyl glycol; 2,2,4,4-tetramethyl-1,3-cyclobutanediol, diethylene glycol, 1,2-propanediol, 1,5-pentanediol, 1,6-hexanediol, p-xylene glycol, 1,3-propanediol and 1,4-butanediol or mixtures thereof;
(c) at least one branching agent in the amount of 0.01 to 1.0 mole %;
wherein the total mole % of the dicarboxylic acid component is 100 mole %, and
wherein the total mole % of the glycol component is 100 mole %;
wherein the inherent viscosity of the polyester is from 0.50 to 0.95 dL/g as determined in 60/40 (wt/wt) phenol/tetrachloroethane at a concentration of 0.25 g/50 ml at 25° C.; and
which has a haze value of less than 5% as measured by ASTM D1003, Method A.

In one aspect of the invention, diethylene glycol is present in the polyesters useful in the invention in the amount of 2 mole % or less.

In one aspect of the invention, an extrusion blow molded article is provided wherein the branching agent is present in the amount of 0.01 to 1.0 mole % based on the total mole of the polyester.

In one aspect of the invention, an extrusion blow molded article is provided wherein the branching agent is present in the amount of 0.1 to 0.6 mole % based on the total mole of the polyester.

In one aspect of the invention, the branching agent can be chosen from at least one of the following: trimellitic acid, trimellitic anhydride, trimethylolpropane, pentaerythritol, and/or trimethylolethane.

In one aspect of the invention, an extrusion blow molded article is provided wherein the difunctional glycol residues are chosen from at least one of 1,4-cyclohexanedimethanol and neopentyl glycol.

In one aspect of the invention, an extrusion blow molded article is provided wherein the difunctional glycol residues consist essentially of 1,4-cyclohexanedimethanol.

In one aspect of the invention, an extrusion blow molded article is provided wherein the difunctional glycol residues consists of 1,4-cyclohexanedimethanol.

In one aspect of the invention, an extrusion blow molded article is provided wherein the polyester comprises: 15 to 25 mole % 1,4-cyclohexanedimethanol or 17 to 22 mole % 1,4-cyclohexanedimethanol.

In one aspect of the invention, an extrusion blow molded article is provided wherein the inherent viscosity of the polyester can be from 0.6 to 0.9 dL/g.

In one aspect of the invention, an extrusion blow molded article is provided wherein the inherent viscosity of the polyester can be from 0.65 to 0.75 dL/g.

In one aspect of the invention, an extrusion blow molded article is provided wherein the inherent viscosity of the polyester can be from 0.68 to 0.72 dL/g.

In one aspect of the invention, an extrusion blow molded article is provided wherein the inherent viscosity of the polyester can be from 0.5 to 0.75 dL/g.

In one aspect of the invention, an extrusion blow molded article is provided wherein the inherent viscosity of the polyester can be from 0.6 to 0.75 dL/g.

In one aspect of the invention, the melt viscosity of said polyester as measured at 240 C and at a shear rate of 1 $sec^{-1}$ is at least 20,000 poise.

In one aspect of the invention, the melt viscosity of said polyester as measured at 240 C and at a shear rate of 1 $sec^{-1}$ is at least 40,000 poise.

In one aspect of the invention, an extrusion blow molded article is provided wherein the polyester can be blended with at least one polymer of poly(etherimides), polyphenylene oxides, poly(phenylene oxide)/polystyrene blends, polystyrene resins, polyphenylene sulfides, polyphenylene sulfide/sulfones, poly(ester-carbonates), polycarbonates, polysulfones; polysulfone ethers, poly(ether-ketones), polyesters other than the primary ones disclosed in this invention, and mixtures thereof.

In one aspect of the invention, an extrusion blow molded article is provided wherein the polyester can be combined with at least one polycarbonate.

In one aspect of the invention, an extrusion blow molded article is provided wherein the polyester is not combined with polycarbonate.

In one aspect of the invention, an extrusion blow molded article is provided wherein the polyester composition can comprise at least one additive chosen from colorants, mold release agents, phosphorus compounds, plasticizers, nucleating agents, UV stabilizers, glass fiber, carbon fiber, fillers, impact modifiers, or a mixture thereof.

In one aspect of the invention, the extrusion blow molded article can be a container.

In one aspect of the invention, the extrusion blow molded article can be a bottle.

In one aspect of the invention, the extrusion blow molded article can be a bottle with a handle.

In one aspect, the extrusion blow molded article can be a container or bottle having an internal volume of at least 1 liter or at least 2 liters; or a bottle having a through-handle.

In one aspect of the invention, an extrusion blow molding process is provided comprising: extrusion blow molding the polyester of the invention at a shear rate of at least 450 $sec^{-1}$ to thereby form an extrusion blow molded article, wherein said extrusion blow molded article has a sidewall haze of less than 15 percent.

In one aspect of the invention, the extrusion blow molding process is carried out at a shear rate of at least 550 $sec^{-1}$.

In one aspect of the invention, the extrusion blow molding process of the invention results in an extrusion blow molded article having a sidewall haze of less than 10 percent.

In one aspect of the invention, the extrusion blow molding process of the invention is carried out at a shear rate of at least 650 $sec^{-1}$.

In one aspect of the invention, the extrusion blow molding process of invention results in an extrusion blow molded article having a sidewall haze of less than 5 percent.

In one aspect of the invention, the extrusion blow molding process of the invention results in a molded article, for example, a container or bottle having an internal volume of at least 1 liter or at least 2 liters; or a bottle having a through-handle.

This invention is believed to provide a transparent material with high resistance to sharkskin in extrusion blow molding. This invention is also believed to be useful for extrusion blow molding into transparent containers, and is believed to have the additional advantage of being non-problematic in the PET recycle stream.

DETAILED DESCRIPTION OF THE FIGURES

FIG. 1 depicts micrographs of the extrudate that were taken using an optical microscope to visually observe whether sharkskin had occurred in Example 21 and Comparative Example 24. At shear rates of 100 sec−1, both materials exhibit a clear appearance and smooth surface, indicating these conditions are suitable for industrial processing. However, at higher shear rates (1000 sec−1), the extrudate of Comparative Example 24 possesses a hazy, irregular surface indicative of sharkskin. Such behavior significantly limits processing of clear parts. On the contrary, the extrudate of Example 21, remains glossy and smooth even at the higher shear rates.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) useful in the invention formed from terephthalic acid, an ester thereof, and/or mixtures thereof, ethylene glycol, and at least one difunctional glycol, and branching agents, can have a unique combination of two or more of the following properties: (1) little or no haze when extrusion blow molded under conditions of high shear; (2) high resistance to sharkskin formation when extrusion blow molded under conditions of high shear; and (3) compatible in the PET recycle stream.

It is believed that the extrusion blow molding process(es) and/or the process(es) used in making the articles according to the present invention are improved because, for example, the extrusion blow molding process(es) can be carried out at higher output rates.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

As used herein, the term "multifunctional" refers to functional compounds that are not mono-functional or difunctional.

The polyesters used in the present invention typically can be prepared from dicarboxylic acids and glycols which react in substantially equal proportions and are incorporated into the polyester polymer as their corresponding residues. The polyesters of the present invention, therefore, can contain substantially equal molar proportions of acid residues (100 mole %) and glycol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 15 mole % 1,4-cyclohexanedimethanol out of a total of 100 mole % glycol residues has 15 moles of 1,4-cyclohexanedimethanol residues among every 100 moles of glycol residues.

In other aspects of the invention, the Tg of the polyesters useful in the polyester compositions of the invention can be at least one of the following ranges: 70 to 90° C.; 70 to 85° C.; 75 to 90° C.; and 75 to 85° C. The glass transition temperature (Tg) of the polyesters useful in the invention was determined using a TA DSC 2920 from Thermal Analyst Instrument at a scan rate of 20° C./min.

In other aspects of the invention, the glycol component employed in making the polyesters useful in the invention can comprise, consist essentially of, or consist of ethylene glycol and one or more difunctional glycols chosen from 1,4-cyclohexanedimethanol, neopentyl glycol, 2,2,4,4-tetramethyl-1,3-cyclobutanediol, diethylene glycol, 1,2-propanediol, 1,5-pentanediol, 1,6-hexanediol, p-xylene glycol, 1,3-propanediol, 1,4-butanediol, and mixtures thereof. When the glycol component comprises residues of 1,4-cyclohexanedimethanol and ethylene glycol, these components can be present in one of the following combinations of ranges: 15 to 25 mole % 1,4-cyclohexanedimethanol, and 75 to 85 mole % ethylene glycol; 15 to 23 mole % 1,4-cyclohexanedimethanol, and 77 to 85 mole % ethylene glycol; 15 to 22 mole % 1,4-cyclohexanedimethanol, and 78 to 85 mole % ethylene glycol; 15 to 21 mole % 1,4-cyclohexanedimethanol, and 79 to 85 mole % ethylene glycol; 15 to 20 mole % 1,4-cyclohexanedimethanol and 80 to 85 mole % ethylene glycol; 16 to 25 mole % 1,4-cyclohexanedimethanol, and 75 to 84 mole % ethylene glycol; 16 to 23 mole % 1,4-cyclohexanedimethanol, and 77 to 84 mole % ethylene glycol; 16 to 21 mole % 1,4-cyclohexanedimethanol, and 79 to 84 mole % ethylene glycol; 16 to 22 mole % 1,4-cyclohexanedimethanol, and 78 to 84 mole % ethylene glycol; 17 to 25 mole % 1,4-cyclohexanedimethanol, and 75 to 83 mole % ethylene glycol; 17 to 24 mole % 1,4-cyclohexanedimethanol, and 76 to 83 mole % ethylene glycol; 17 to 23 mole % 1,4-cyclohexanedimethanol, and 77 to 83 mole % ethylene glycol; 17 to 22 mole % 1,4-cyclohexanedimethanol, and 78 to 83 mole % ethylene glycol; 15 to 20 mole % 1,4-cyclohexanedimethanol and 80 to 85 mole % ethylene glycol; and 20 to 25 mole % 1,4-cyclohexanedimethanol and 75 to 80 mole % ethylene glycol.

When 1,4-cyclohexanedimethanol is employed as all or part of the glycol component, the 1,4-cyclohexanedimethanol may be cis, trans, or a mixture thereof. The molar ratio of cis/trans 1,4-cyclohexanedimethanol can vary within the range of 50/50 to 0/100 or 40/60 to 20/80. In one embodiment, the 1,4-cyclohexanedimethanol has a cis/trans ratio of 60:40 to 40:60 or a cis/trans ratio of 70:30 to 30:70. In another embodiment, the trans-cyclohexanedimethanol can be present in an amount of 60 to 80 mole % and the cis-cyclohexanedimethanol can be present in an amount of 20 to 40 mole % wherein the total percentages of cis-cyclohexanedimethanol and trans-cyclohexanedimethanol is equal to 100 mole %. In particular embodiments, the trans-cyclohexanedimethanol can be present in an amount of 60 mole % and the cis-cyclohexanedimethanol can be present in an amount of 40 mole %. In particular embodiments, the trans-cyclohexanedimethanol can be present in an amount of 70 mole % and the cis-cyclohexanedimethanol can be present in an amount of 30 mole %.

In one embodiment, the glycol component of the polyester useful in the invention can contain up to 10 mole % of one or more modifying difunctional glycols which are not ethylene glycol, diethylene glycol, or 1,4-cyclohexanedimethanol. In one embodiment, the glycol component of the polyester portion of the polyester compositions useful in the invention can contain from 0.01 to 10 mole % of one or more modifying difunctional glycols which are not ethylene glycol, diethylene glycol, or 1,4-cyclohexanedimethanol. In one embodiment, the glycol component of the polyester portion of the polyester compositions useful in the invention can contain from 0.01 to 5 mole % of one or more modifying difunctional glycols which are not ethylene glycol, 1,4-cyclohexanedimethanol, or diethylene glycol. In another embodiment, the polyesters useful in the invention can contain 0 mole % modifying glycols.

Modifying glycols useful in the polyesters useful in the invention refer to diols other than 1,4-cyclohexanedimethanol, diethylene glycol, and ethylene glycol and can contain 2 to 16 carbon atoms. Examples of suitable modifying glycols include, but are not limited to, 1,2-propanediol, 1,3-propanediol, neopentyl glycol, 1,4-butanediol, 1,5-pentanediol, 1,6-hexanediol, p-xylene glycol, polytetramethylene glycol, 2,2,4,4-tetramethyl-1,3-cyclobutanediol, and mixtures thereof. In another embodiment, the modifying glycols include, but are not limited to, at least one of 1,3-propanediol and 1,4-butanediol.

In one embodiment, the diethylene glycol is not added as a separate monomer but is formed during polymerization.

In certain embodiments, the dicarboxylic acid component used to make the polyesters useful in the invention can comprise, consist essentially of, or consist of terephthalic acid or an ester thereof, (e.g., dimethyl terephthalate) or a mixture of terephthalic acid residues and an ester thereof. In certain embodiments, terephthalic acid residues can make up a portion or all of the dicarboxylic acid component used to form the polyesters useful in the invention. In one embodiment, dimethyl terephthalate is part or all of the dicarboxylic acid component used to make the polyesters useful in the present invention. In certain embodiments, terephthalic acid and/or dimethyl terephthalate and/or mixtures thereof are present in the polyester in one of the following amounts based on total acid residues: 70 to 100 mole %; or 80 to 100 mole %; or 90 to 100 mole %; or 95 to 100 mole %; or 99 to 100 mole %; or 100 mole %.

In addition to terephthalic acid and/or dimethyl terephthalate, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, 0.01 to 5 mole % and 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The dicarboxylic acid component of the polyesters useful in the invention can be further modified with up to 10 mole %, up to 5 mole % or up to 1 mole % of one or more aliphatic dicarboxylic acids containing 2 to 16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, 0.1 to 10 mole %, 1 to 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention. Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In certain embodiments, the polyesters useful in the invention can comprise a branching monomer, also referred to herein as a branching agent. When the polyester contains a branching agent, the branching agent can be present in an amount in the range of 0.01 to 1 mole %, or 0.1 to 0.6 mole %, based on the total mole percentages of either the glycol or diacid residues.

In one embodiment, the branching monomer present in the polyester has 3 or more carboxyl substituents, hydroxyl substituents, or a combination thereof. Examples of branching monomers include, but are not limited to, multifunctional acids or multifunctional alcohols such as trimellitic acid, trimellitic anhydride, pyromellitic dianhydride, trimethylolpropane, glycerol, sorbitol, 1,2,6-hexanetriol, pentaerythritol, citric acid, tartaric acid, 3-hydroxyglutaric acid, trimesic acid and the like. In one embodiment, the branching monomer residues are chosen from at least one of the following: trimellitic acid, trimellitic anhydride, trimethylolpropane, pentaerythritol, and/or trimethylolethane.

In certain embodiments, the branching monomer or agent may be added prior to and/or during and/or after the polymerization of the polyester. The polyester(s) useful in the invention can thus be linear or branched. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

In certain embodiments, the polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 to about 10% by weight, or about 0.1 to about 5% by weight, based on the total weight of the polyester.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g; 0.70 to 0.95 dL/g; 0.70 to 0.90 dL/g; 0.70 to 0.85 dL/g; 0.70 to 0.80 dL/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the Tg ranges described herein and at least one of the monomer ranges for the compositions described herein unless otherwise stated. It is also contemplated that compositions useful in the invention can possess at least one of the inherent viscosity ranges described herein, at least one of the Tg ranges described herein, and at least one of the monomer ranges for the compositions described herein unless otherwise stated.

In addition, the polyester compositions and the polymer blend compositions useful in the invention may also contain any amount of at least one additive, for example, from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be useful in the polyester compositions useful in this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In addition, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toner(s) can be added to the esterification zone or to the polycondensation zone. Preferably, the toner(s) are added to the esterification zone or to the early stages of the polycondensation zone, such as to a prepolymerization reactor.

In one embodiment, certain polyesters useful in this invention can be visually clear. The term "visually clear" is defined herein as an appreciable absence of cloudiness, haziness, and/or muddiness, when inspected visually. In another embodiment, when the polyesters are blended with polycarbonate, including but not limited to, bisphenol A polycarbonates, the blends can be visually clear.

In one embodiment, the articles of the invention have a haze value of less than 5% at shear rates greater than 500 sec$^{-1}$ as measured by ASTM D1003, Method A.

The polyesters useful in the invention can be made by processes known from the literature such as, for example, by processes in homogeneous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

In one embodiment, certain polyesters useful in the invention can exhibit a melt viscosity (MV) at a shear rate of 1 rad/sec of greater than 20,000 poise, greater than 30,000 poise, or greater than 40,000 poise, where the melt viscosity is measured at 240° C. and 1 rad/sec using a rotary viscometer such as a Rheometrics Dynamic Analyzer (RDA II).

In another aspect, this invention relates to a process for preparing extrusion blow molded articles. The extrusion blow molding process can be any extrusion blow molding manufacturing process known in the art. Although not limited thereto, a typical description of extrusion blow molding manufacturing process involves: 1) melting the resin in an extruder; 2) extruding the molten resin through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

The hot parison that is extruded in this process often must hang for several seconds under its own weight prior to the mold being clamped around it. During this time, the extrudate must have good molten dimensional stability, also known as melt strength. Melt strength is directly related to the viscosity of the material at a shear rate of 1 sec$^{-1}$. A material with good melt strength (i.e. high viscosity) can resist stretching and flowing (a.k.a. sag) that would cause uneven material distribution in the parison and thinning of the parison walls. The sag of the extruded parison is directly related to the weight of the parison, whereby larger and heavier parisons will have a greater tendency to sag. Heavier parisons can be required as bottle size increases, whereby the production of larger bottles requires higher melt strength. Materials with high melt strength will also resist tearing while the parison is blown into a bottle. Thus, good melt strength is required to form good quality containers, particularly those of larger size, that have uniform side wall thickness and that will not tear during expansion (i.e. blowing).

The two types of extrusion blow molding that involve a hanging parison are referred to as "shuttle" and "intermittent" processes. In a shuttle process, the mold is situated on a moving platform that moves the mold up to the extruder die, closes it around the parison while cutting off a section, and then moves away from the die to inflate, cool and eject the bottle. Due to the mechanics of this process, the polymer is continuously extruded through the die at a relatively slow rate. By contrast, the mold in an intermittent process is fixed below the die opening and the full shot weight (the weight of the bottle plus flash) of polymer must be rapidly pushed through the die after the preceding bottle is ejected but before the current bottle is inflated. Intermittent processes can either utilize a reciprocating screw action to push the parison, or the extrudate can be continuously extruded into a cavity which utilizes a plunger to push the parison.

In a very different type of extrusion blow molding process, a 4 to 20 ft diameter wheel moving at 1 to 10 revolutions per minute grabs the parison as it extrudes from the die and lays it in molds attached to the wheel's outer circumference. Mold close, parison inflation, cooling and ejection of the bottle occurs sequentially as the wheel turns. In this "wheel process", the parison is actually pulled from the die by the wheel whereby good melt strength is required to prevent thinning of the parison during both pulling as well as subsequent blowing. The parison in a wheel process can exit the die in either an upward or downward direction and melt strength will be more crucial during upward extrusion due to the effects of gravity. Because of the continuous nature of this "wheel" process, polymer can be extruded from the die at very high speeds.

In certain embodiments of the present invention, the polyester composition useful in the invention is extrusion blow molded at high speeds to form a molded article. The resulting extrusion blow molded article can have one or more of the following characteristics: 1) exhibits little or no haze; 2) exhibits little or no sharkskin; and/or 3) can be added to a PET recycle process in significant quantities without adversely affecting the recycle process.

The high speed extrusion blow molding process used to form molded articles out of the polyester composition useful in the invention disclosed herein can be carried out at shear rates of at least 450 sec$^{-1}$, at least 500 sec$^{-1}$, at least 550 sec$^{-1}$, or at least 600 sec$^{-1}$. In certain embodiments, the shear rate of the extrusion blow molding process is in the range of 500 to 10,000 sec$^{-1}$, 600 to 5,000 sec$^{-1}$, or 700 to 2,000 sec$^{-1}$. Shear rates are calculated from the equation $\dot{\gamma}=8.6Q/WH^2$, where Q is the volumetric output rate through the die, W is the width of the die and H is the die gap opening height of the die. The output rate is determined by measuring the mass of material extruded over a fixed time interval, multiplying by the melt density and converting to pounds per hour.

When polyesters according to embodiments of the present invention are extrusion blow molded at one or more of the high shear rates discussed above, they surprisingly exhibit little or no haze. In particular, extrusion blow molded articles made from the inventive polyesters discussed herein at one or more of the shear rates discussed above can exhibit haze values of less than 15%, less than 10%, less than 7%, less than 5%, or less than 4%. Haze is measured on sidewalls of molded bottles or on 3 mm molded plaques according to ASTM D 1003, Method A, and is calculated as a percentage, from the ratio of diffuse transmittance to total light transmittance. A BYK-Gardner HazeGuard Plus is used to measure haze.

In one embodiment, the extrusion blow molded article is formed entirely of the polyester composition useful in the invention. In other embodiments, the polyester composition useful in the invention can be mixed with another composition prior to extrusion blow molding. However, even when the polyester composition useful in the invention is mixed with another composition prior to extrusion blow molding, the resulting extrusion blow molded articles can still contain the novel polyester composition in an amount of at least 50 weight %, at least 75 weight %, at least 90 weight %, at least 95 weight %, or at least 98 weight %.

In one embodiment, the extrusion blow molded article formed in accordance with the description provided herein is a relatively large container or bottle. The extrusion blow molded article can be a container or bottle having an internal volume of at least 1 liter, at least 1.5 liters, at least 2 liters, at least 2.5 liters, or at least 3 liters. Further, the extrusion blow molded article can be a large container or bottle having an integral through-handle formed by extrusion blow molding.

This invention also contemplates the manufacture of articles using any method of profile extrusion known in the art. Profile extrusion is a common, cost-effective method for producing shaped articles. Profiles can take on a wide variety of cross-sections varying in size, shape and complexity. Common "simple" profile shapes include hollow tubes, solid round stock, square cross-section stock, etc. More complex shapes such as those used for pricing channels, corner guards, and house siding can also be made. Profiles can be fabricated by melt extrusion processes that begin by extruding a thermoplastic melt through an orifice of a complex die thereby forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate can maintain shape without any structural assistance. With extremely complex shapes, support means are often used to assist in shape retention. In either case, the type of thermoplastic resins utilized and its melt strength during formation is critical. For example, when extruded vertically from a die, a polymer with low melt strength will quickly sag and hit the floor; whereas, a polymer with high melt strength will maintain its shape for a much longer amount of time.

Typical profile extrusion line speeds and temperatures, are not limited to, however, can be from 390-550° F. (200-290° C.) and require good melt strength. Process line speeds vary considerably depending on the shape of the profile. Typical speeds for simple shapes like a corner guard may be from 50 to 70 feet (15 to 20 meters) per minute. More complicated shapes may have process line speeds as low as one foot (0.3 meters) per minute, whereas extremely simple shapes with certain types of processing technology may run at speeds as high as 100 feet (30 meters) per minute.

Profiles can take on a wide variety of cross-sections varying in size, shape and complexity. Common "simple" profile shapes include hollow tubes, solid round stock, square cross-section stock, etc. More complex shapes such as those used for pricing channels, corner guards, and house siding can also be made. Profiles are fabricated by melt extrusion processes that begin by extruding a thermoplastic melt through an orifice of a complex die thereby forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. With extremely complex shapes, support means are often used to assist in shape retention. In either case, the type of thermoplastic resins utilized and its melt strength during formation is critical. For example, when extruded vertically from a die, a polymer with low melt strength will quickly sag and hit the floor; whereas, a polymer with high melt strength will maintain its shape for a much longer amount of time.

At the higher speeds, which obviously would be preferred by profile manufacturers to reduce cost, inadequate melt strength produces an extrudate that does not maintain its shape prior to quenching, and thus deformation occurs. To increase the melt strength of the polyester, processing temperatures are often lowered. This, however, increases the likelihood of sharkskin, which can only be eliminated by lowering the extrusion speed. By decreasing speed, the economic attractiveness of using polyesters is also decreased. Thus, the profile extrusion processes are often operated at maximum speeds associated with the highest temperatures and minimal melt strengths for maintaining particular profile shapes. Any increase in speed or lowering of temperature may cause an increase in high shear viscosity in the die, which then may cause undesirable sharkskin. The die gap thickness in profile extrusion is often 1 mm or less. Shear-stress at the die land in these cases is most often extreme, thus making the onset of sharkskin quite common.

In another aspect, this invention relates to a process for recycling polyesters wherein flakes of extrusion blow molded articles and/or profile extrusions made in accordance with embodiments described herein are combined with flakes of recycled PET to thereby form a combined polyester recycle stream. The resulting combined polyester recycle stream can comprise flakes of the extrusion blow molded articles and/or profile extrusions in an amount of at least 5 weight %, at least 10 weight %, at least 15 weight %, %, at least 20 weight %, or at least 25 weight %. Further, the amount of flakes of the extrusion blow molded articles and/or profile extrusions in the combined polyester recycle stream can be less than 50 weight %, less than 40 weight %, or less than 30 weight %.

The combined combined polyester recycle stream can be introduced into a conventional PET recycle facility. Typically, one of the initial stages of the PET recycling facilities includes a dryer operating at an average temperature of at least 100° C., at least 125° C., or at least 140° C. and less than 250° C., less than 210° C., or less than 180° C. The dryer can include a hopper at the dryer opening. When flakes of conventional extrusion blow molded articles are processed in the dryer of a PET recycling facility in the amounts described above, severe clumping can occur. This clumping can cause the dryer to operate inefficiently and/or can cause plugging of the dryer. However, flakes made from extrusion blow molded articles and/or profile extrusions of the present invention can be processed in a conventional PET recycling facility in the above-described amounts without plugging the dryer.

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The following abbreviations are used throughout the examples that follow:

| | |
|---|---|
| CHDM | 1,4-cyclohexanedimethanol |
| DMT | Dimethyl therephthalate |
| EG | Ethylene glycol |
| IV | Inherent viscosity |
| MV | Melt viscosity |
| $T_g$ | Glass transition temperature |
| $T_m$ | Melting point |
| TMA | Trimellitic anhydride |
| TMAc | Trimellitic acid |
| TMAH | Tetramethylamonium hydroxide |

The polyesters of the following examples were prepared by subjecting dimethyl terephthalate to ester interchanged with the diols at elevated temperatures in the presence of a catalyst. Thereafter; polycondensation was carried out at increasing temperatures and at reduced pressures until a polyester having the desired inherent viscosity (IV) was obtained. All pellets were amorphous as they emerged from the reactor.

The compositions of the polyesters discussed in the following examples were measured by proton nuclear magnetic resonance (NMR) spectroscopy. All NMR spectra were recorded on a JEOL Eclipse Plus 600 MHz nuclear magnetic resonance spectrometer using chloroform-trifluoroacetic acid (70-30 volume/volume).

The trimellitic anhydride (TMA) content of the polyesters was measured using a liquid chromatography technique based on hydrolysis of the polyester. To determine TMA content approximately 0.10 g of sample is weighed into a 20 ml headspace vial, and then the vial is capped and placed into the sample tray of a LEAP Technologies automated liquid handling station. The sample was then hydrolyzed with tetramethylammonium hydroxide (TMAH) in a DMSO/Methanol mixture to yield free TMAc (the acid). The prepared sample was analyzed by high performance ion-exchange chromatography by injection onto a strong anion exchange column for separation from the other components in the sample. Analysis was conducted using an Agilent 1100 HPLC system. The TMAc content was quantified using UV detection. The measured TMAc value was converted to weight equivalent TMA by using the multiplier 0.9143 (the MW ratio of TMA/TMAc).

The inherent viscosity (IV) of the polyesters was determined in 60/40 (wt/wt) phenol/tetrachloroethane at a concentration of 0.25 g/50 ml at 25° C., and is reported in dL/g.

The melting point (Tm) values of the polyesters were determined using a TA DSC 2920 instrument from Thermal Analyst Instruments at a scan rate of 20° C./min according to ASTM D3418. The scan was run from 23° C. to 290° C. Samples were dried at 160° C. for 2 hours prior to measuring the Tm.

The crystallization half-time was determined by measuring the light transmission of a sample via a laser and photo detector as a function of time on a temperature controlled hot stage. This measurement was done by exposing the polymers to a maximum temperature required to melt the crystalline domains of the sample (if crystalline domains are presents) and then cooling it to the desired temperature. This maximum temperature is dependent on composition and could be different for each composition. The sample was then held at the desired temperature by a hot stage while transmission measurements were made as a function of time. Initially, the sample was visually clear with high light transmission and became opaque as the sample crystallized. The crystallization half-time was recorded as the time at which the light transmission was halfway between the initial transmission and the final transmission.

Density was determined using a gradient density column at 23° C.

Melt viscosity (MV) values were measured by using a Rheometrics Dynamic Analyzer (RDA II). The MV was measured as a function of shear rate, at frequencies ranging from 1 to 400 rad/sec, at the temperatures reported.

Several of the polyesters described in Examples 1-10, below, were subsequently processed using an 80 mm Bekum H-121 continuous extrusion blow molding machine fitted with a barrier screw. The materials were dried for 12 hours at 65° C. prior to extrusion. The temperatures of the extruded parisons shown in the examples were measured by a melt probe ¼" from die exit. Compositions with sufficient melt strength were blown into 1.74 liter bottles having through-handles.

Dryer testing was performed to assess the compatibility of the polyesters in a conventional PET recycle process. The dryer testing was carried out by granulating the extrusion blow molded bottles and mixing the resulting flake with commercially available food-grade PET PCR (post-consumer recycle) flake obtained from United Resources Recovery Corporation. The dryer test apparatus consisted of a 1000-lb capacity hopper dryer equipped with a desiccant unit and two Conair DB12 vacuum loaders. One loader sat atop the hopper and was operated so that the hopper remained full of flake for the duration of the test. The second loader was connected to the hopper outlet via a 1.75-in diameter flexible hose and a metal air inlet tube such as is used in commercial airveying processes for pellets or flake. The second loader's intermittent suction time was set so that flake was airveyed from the hopper at a nominal rate of 160 lb/hr, which gave an approximate hopper residence time of 3 to 4 hours. The test procedure began with filling the hopper with PET PCR flake and drying for 6 hours at 160° C. The dryer was operated at 160° C. for the duration of the test. The second vacuum loader was then started so as to draw flake from the hopper at the specified rate. The first loader, atop the hopper, was also started so as to keep the hopper replenished with a flake blend made from example bottles and PET PCR. Each hour during the test, several loads airveyed from the hopper were captured and weighed to assess flow rate. Flake airveyed from the hopper was also passed through a 0.5-in by 0.5-in mesh screen to capture small clumps, if any, of PET PCR stuck together by flake from the example. The test continued for several hours until the test blend had passed through the hopper or until such time as flow was severely impeded or stopped due to excessive clumping or bridging in the hopper.

Haze was measured on bottle sidewalls and 3 mm molded plaques using a BYK-Gardner HazeGuard Plus Spectrophotometer according to ASTM D1003, Method A. The plaques were prepared by first dry blending pellets of the example into pellets of a typical bottle grade PET (CB12 from Eastman Chemical Company), then melt extruding the dry blend on a Sterling 1.25" single screw extruder to homogenize the material, and then injection molding the extrudate. Plaques of the CB12 material were also molded as a control. The haze of the CB12 plaques was 5.8%.

Example 1

Comparative Example

This example illustrates the preparation of bottles using an extrusion blow molding process. The polymer used in this example contained 100% dimethyl terephthalate (DMT) as the dialkyl dicarboxylate moiety and a mixture of 69 mole % ethylene glycol (EG) and 31 mole % 1,4-cyclohexanedimethanol (CHDM) as the glycol component. The material also contained 0.18 weight % (0.20 mole %) trimellitic acid (TMA) moiety. The IV was 0.76 dL/g. The melt viscosity (MV) at 240° C. at 1 rad/sec was 45,777 poise. Neither a melting point (Tm) nor a crystallization half-time could be measured. Amorphous pellets of this composition were extrusion blow molded into bottles at a melt temperature of 230° C. (442° F.). The bottles were ground for dryer testing. A mixture of 3% flake of this composition in PET flake caused severe clumping in the dryer and completely stopped flow from the dryer. A blend of 1 weight % did not impede flow but did show moderate clumping.

Example 2

Comparative Example

This example illustrates the preparation of bottles using an extrusion blow molding process. The polymer used in this example contained 100% DMT as the dialkyl dicarboxylate moiety and a mixture of 50 mole % EG and 50 mole % CHDM as the glycol component. The material also contained 0.18 weight % (0.22 mole %) TMA moiety. The IV was 0.76 dL/g. The MV at 240° C. at 1 rad/sec was 47,058 poise. The Tm was measured to be 193° C. The crystallization half-time of this material was measured to be greater than 300 minutes at 160° C. Amorphous pellets of this composition were extrusion blow molded into bottles at a melt temperature of 230° C. (442° F.). Bottles were ground for dryer testing. A mixture of 15 weight % flake of this composition in PET flake caused severe clumping in the dryer and completely stopped flow from the dryer. A mixture of 10 weight % flake of this composition in PET flake impeded flow and showed moderate clumping. Molded plaques containing 10 weight % of this composition in CB12 exhibited haze values of 12.4%. Thus, the addition of 10 weight % of this composition to PET will cause unacceptable haze and will cause problems in the recycle stream at these levels.

Example 3

Comparative Example

This example illustrates the preparation of bottles using an extrusion blow molding process. The polymer used in this example contained 100% DMT as the dialkyl dicarboxylate moiety and a mixture of 89.1 mole % EG and 10.9 mole % CHDM as the glycol component. The material also contained 0.18 weight % (0.19 mole %) TMA moiety. The IV was 0.74 dL/g. The Tm was measured to be 224° C. This composition could not be extrusion blow molded. In order to prevent crystallization of the parison, the material had to be processed at a temperature above its Tm and at this temperature the melt strength was very low. This composition would need a much higher IV in order to improve its melt strength, but it would be difficult to manufacture this composition to a higher IV without solid stating it.

Example 4

Example of the Invention

This example illustrates the preparation of bottles using an extrusion blow molding process. The polymer used in this example contained 100% DMT as the dialkyl dicarboxylate moiety and a mixture of 84.0 mole % EG and 16.0 mole % CHDM as the glycol component. The material also contained 0.18 weight % (0.19 mole %) TMA moiety. The IV was 0.75 dL/g. The Tm was measured to be 205° C. Amorphous pellets of this sample could not be extrusion blow molded due to surging of the extrudate. Crystallizing the pellets prior to extrusion blow molding prevented surging and permitted bottle production. Bottles were ground for dryer testing. A mixture of 25% flake of this composition in PET flake showed virtually no clumping in the dryer and did not impede flow from the dryer.

Example 5

Example of the Invention

This example illustrates the preparation of bottles using an extrusion blow molding process. The polymer used in this example contained 100% DMT as the dialkyl dicarboxylate moiety and a mixture of 78.7 mole % EG and 21.3 mole % CHDM as the glycol component. The material also contained 0.18 weight % (0.20 mole %) TMA moiety. The IV was 0.73 dL/g. The Tm of this sample was not measured. Amorphous pellets of this composition were extrusion blow molded into bottles at a melt temperature of 222° C. (432° F.). Bottles were ground for dryer testing. A mixture of 10 weight % flake of this composition in PET flake showed virtually no clumping in the dryer and did not impede flow from the dryer.

Example 6

Example of the Invention

This example illustrates the preparation of bottles using an extrusion blow molding process. The polymer used in this example contained 100% DMT as the dialkyl dicarboxylate moiety and a mixture of 82.6 mole % EG and 16.8 mole % CHDM as the glycol component. The material also contained 0.18 weight % (0.19 mole %) TMA moiety. The IV was 0.73 dL/g. The MV at 240° C. at 1 rad/sec was 40,517 poise. The Tm was measured to be 204° C. Amorphous pellets of this sample could not be extrusion blow molded at a melt temperature of 232° C. (450° F.) due to surging of the extrudate. Crystallizing the pellets prior to extrusion blow molding prevented surging and permitted bottle production at a melt temperature of 226° C. (439° F.). Molded plaques containing 25 weight % of this composition in CB12 exhibited haze values of 5.7%. This value is comparable to the neat PET value of 5.8% provided above. Thus, this composition does not cause any haze when added to PET at 25 weight %.

Example 7

Example of the Invention

The polymer used in this example contained 100% DMT as the dialkyl dicarboxylate moiety and a mixture of 84.5 mole % Ed and 15.5 mole % CHDM as the glycol component. The material also contained 0.18 weight % (0.19 mole %) TMA moiety. The IV was 0.68 dL/g. The MV at 240° C. at 1 rad/sec was 24,668 poise. The Tm was measured to be 210° C.

Example 8

Example of the Invention

This example illustrates the preparation of bottles using an extrusion blow molding process. The polymer used in this example was prepared by mixing together material from Examples 1, 6 and 7 to create a composition containing 100% DMT as the dialkyl dicarboxylate moiety and a mixture of 81.8 mole % EG and 19.2 mole % CHDM as the glycol component. The material also contained 0.18 weight % (0.19 mole %) TMA moiety. The IV was 0.69 dL/g. The Tm was measured to be 208° C. The crystallization half-time of this material was measured to be 35 minutes at 160° C. This composition was extrusion blow molded into bottles at a melt temperature of 225° C. (437° F.). Bottles were ground for dryer testing. A mixture of 15 weight % flake of this composition in PET flake showed virtually no clumping in the dryer and did not impede flow from the dryer.

Example 9

Example of the Invention

This example illustrates the preparation of bottles using an extrusion blow molding process. The polymer used in this example contained 100% DMT as the dialkyl dicarboxylate moiety and a mixture of 79.4 mole % EG and 20.6 mole % CHDM as the glycol component. The material also contained 0.31 weight % (0.34 mole %) TMA moiety. The IV was 0.69 dL/g. The MV at 240° C. at 1 rad/sec was 30,358 poise. The Tm was measured to be 202° C. The crystallization half-time of this material was measured to be 59 minutes at 160° C. Amorphous pellets of his composition were extrusion blow molded into bottles at a melt temperature of 225° C. (437° F.). Bottles were ground for dryer testing. A mixture of 25 weight % flake of this composition in PET flake showed virtually no clumping in the dryer and did not impede flow from the dryer. Molded plaques containing 25 weight % of this composition in CB12 exhibited haze values of 4.6%. This value is comparable to the neat PET value of 5.8% provided above. Thus, this composition does not cause any haze when added to PET at 25 weight %.

Example 10

Example of the Invention

The polymer used in this example contained 100% DMT as the dialkyl dicarboxylate moiety and a mixture of 79.4 mole % EG and 20.6 mole % CHDM as the glycol component. The material also contained 0.31 weight % (0.34 mole %) TMA moiety. The IV was 0.73 dL/g. The MV at 240° C. at 1 rad/sec was 47,882 poise. The Tm of this sample was not measured. Amorphous pellets of his composition were extrusion blow molded into bottles at a melt temperature of 225° C. (437° F.).

Examples 11-12

Reciprocating Screw EBM

In the following examples, materials were processed using a Uniloy Milacron 350 reciprocating screw EBM machine with a 2.5 inch diameter die producing a ½ gallon dairy container. The process shear rate experienced by the parison upon exiting the die was estimated to be 10,000 sec$^{-1}$. Haze was measured on a sidewall section of the bottle to quantify if sharkskin was present.

Example 11

Example of the Invention

The polymer prepared in Example 9 was processed at a temperature of 238° C. (460° F.). Bottles were obtained without difficulty. No sharkskin was observed during processing. Bottle sidewall haze was measured at 1.0%. Average bottle sidewall thickness was 0.02 inches.

Example 12

Comparative Example

The polymer prepared in Comparative Example 2 was processed at a melt temperature of 231 C (448 F). Severe sharkskin was observed during processing. Bottle sidewall haze was measured at 62.0%. Average bottle sidewall thickness was 0.02 inches.

Example 13

Example of the Invention (Wheel EBM)

In the following example, material was processed using a Graham Machinery wheel EBM machine with a 2.7 inch diameter die producing an 89 oz. handleware container. The extruder was run at an output rate of 1770 pounds per hour. The process shear rate experienced by the parison upon exiting the die was estimated to be 500 sec$^{-1}$. Haze was measured on a sidewall section of the bottle to quantify if sharkskin was present. The polymer prepared in example 9 was processed at a temperature of 260° C. (500° F.). Bottles were obtained without difficulty. No sharkskin was observed during processing. Bottle sidewall haze was measured at 1.96%. Average bottle sidewall thickness was 0.04 inches.

Table 1, below, summarizes the results of Examples 1-13. In particular, Table 1 demonstrates that the polyesters of comparative Examples 1, 2, and 12 are incompatible with PET recycle processes and/or exhibit significant haze, while the polyesters of Examples 2-11 and 13 are compatible with PET recycling processes and/or exhibit little haze.

type screw common for polyester processing. The die has a streamlined transition section, which enters a plate with a flat, thin entrance and exit. The die exit consists of a slot 3" wide with a gap thicknesses of 0.060" and a 0.60" land length. To compensate for differences in IV, extrusion was performed at temperatures such that each resin had identical melt strength (i.e. an 8000 Pa-s±1000 Pa-s viscosity at 1 sec$^{-1}$). Each material was dried for 6 hours at 150° F. prior to extrusion.

Example 14

Example of the Invention

The polymer prepared in example 6 was processed at a temperature of 213° C. (415° F.).

Example 15

Example of the Invention

The polymer prepared in example 7 was processed at a temperature of 206° C. (403° F.).

Example 16

Example of the Invention

The polymer prepared in example 9 was processed at a temperature of 209° C. (408° F.).

Example 17

Comparative Example

The polymer prepared in comparative example 1 was processed at a melt temperature of 221° C. (430° F.).

TABLE 1

PET Recycle Compatibility and Haze

| | | Polyester Properties | | | | Compatiblity w/PET Recycle | | Haze | |
| --- | --- | --- | --- | --- | --- | --- | --- | --- | --- |
| Example | EBM Process | CHDM (mole %) | IV (dL/g) | MV (poise) | Tm (° C.) | Blend w/ PET (wt %) | Dryer Performance | Plaque (%) | Sidewall (%) |
| 1 (Comp) | Cont. | 31 | 0.76 | 45,777 | — | 3 | Dryer stopped | — | — |
| | | | | | | 1 | Moderate clumping | — | — |
| 2 (Comp) | Cont. | 50 | 0.76 | 47,058 | 193 | 15 | Dryer stopped | — | — |
| | | | | | | 10 | Moderate clumping | 12.4 | — |
| 3 (Inv) | Cont. | 10.9 | 0.74 | — | 224 | — | — | — | — |
| 4 (Inv) | Cont. | 16 | 0.75 | — | 205 | 25 | No clumping | — | — |
| 5 (Inv) | Cont. | 21.3 | 0.73 | — | — | 10 | No clumping | — | — |
| 6 (Inv) | Cont. | 16.8 | 0.73 | 40,517 | 204 | 25 | — | 5.7 | — |
| 7 (Inv) | Cont. | 15.5 | 0.68 | 24,668 | 210 | — | — | — | — |
| 8 (Inv) | Cont. | 19.2 | 0.69 | — | 208 | 15 | No clumping | — | — |
| 9 (Inv) | Cont. | 20.6 | 0.69 | 30,358 | 202 | 25 | - No clumping | — | — |
| | | | | | | | | 4.6 | — |
| 10 (Inv) | Cont. | 20.6 | 0.73 | 47,882 | — | — | — | — | — |
| 11 (Inv) | Recip. | | | Same material as Example 9 | | | | | 1.0 |
| 12 (Comp) | Recip | | | Same material as Example 2 | | | | | 62.0 |
| 13 (Inv) | Wheel | | | Same material as Example 9 | | | | | 1.96 |

Examples 14-18

Profile Extrusions

The following examples illustrate the preparation of profile extrusions. The plastication machine used in these experiments was a Davis-Standard DS-25 2.5 inch extruder with a three-zone air-cooled barrel. The screw is a standard barrier

Example 18

Comparative Example

The polymer prepared in comparative example 2 was processed at a melt temperature of 224° C. (435° F.).

In Examples 14-18, the potential for sharkskin was determined by extruding molten polymer at various RPM settings through a flat panel die on a profile extrusion line and measuring haze levels in the final part. Shear rates at each RPM were calculated from the equation $\dot{\gamma}=8.6Q/WH2$, where Q is the volumetric output rate through the die, W is the width of the die (76.2 mm) and H is the die gap opening height of the die (1.52 mm). The output rate was determined by measuring the mass of material extruded over a fixed time interval, multiplying by the melt density and converting to lbs/hour. Haze was measured according to ASTM D 1003, Method A, and is calculated as a percentage, from the ratio of diffuse transmittance to total light transmittance. A BYK-Gardner HazeGuard Plus was used to measure haze.

The results of Examples 14-18 are summarized in Table 2, below. As can be see from Table 2, while the comparative examples begin showing significant levels (>5% haze) of sharkskin at shear rates greater than 200 $sec^{-1}$, the examples of the invention are essentially haze free (<5% Haze) at shear rates well over 500 $sec^{-1}$. This is significant as shear rates through dies in intermittent and wheel processes can often fall between 500 and 1000 $sec^{-1}$. The comparative examples would sharkskin at these rates and would be unsuitable for use in intermittent and wheel processes.

TABLE 2

Haze of Profile Extrusions at Various Shear Rates

| Example | | | | |
|---|---|---|---|---|
| 14 (Inv) | 15 (Inv) | 16 (Inv) | 17 (Comp) | 18 (Comp) |
| CHDM (mole %) | | | | |
| 16.8 | 15.5 | 20.6 | 31 | 50 |
| Melt Temperature @ 10 RPM | | | | |
| 213° C. | 206° C. | 209° C. | 221° C. | 224° C. |
| Viscosity at 1 $sec^{-1}$ at Melt Temp | | | | |
| 9000 Pa-s | 7000 Pa-s | 8100 Pa-s | 8700 Pa-s | 7700 Pa-s |

| RPM | Shear rate | Haze % | Shear rate | Haze % | Shear rate | Haze % | Shear rate | Haze % | Shear rate | Haze % |
|---|---|---|---|---|---|---|---|---|---|---|
| 5 | nr | nr | nr | nr | nr | nr | 133 | 2 | 141 | 2 |
| 10 | 208 | 3 | 177 | 2 | 168 | 2 | 239 | 3 | 248 | 29 |
| 15 | 299 | 2 | 261 | 2 | nr | nr | 346 | 9 | 354 | 55 |
| 20 | 391 | 2 | 344 | 2 | 360 | 3 | 452 | 16 | nr | nr |
| 25 | 482 | 1 | 428 | 3 | nr | nr | 558 | 31 | nr | nr |
| 30 | 573 | 2 | 512 | 3 | 551 | 2 | nr | nr | nr | nr |
| 35 | 665 | 2 | 595 | 3 | nr | nr | nr | nr | nr | nr |
| 40 | nr | nr | nr | nr | 742 | 1 | nr | nr | nr | nr |
| 50 | nr | nr | nr | nr | 933 | 2 | nr | nr | nr | nr |

"nr" indicates no value was recorded

Examples 19-24

Capillary Extrusion

The following examples further demonstrate the superior resistance to sharkskin exhibited by the polyester of the invention. Materials were extruded on a Goettfert Rheograph 2002 capillary rheometer, using a long capillary (0.792 mm diameter, 30 mm length) and 20 kN force transducer. All materials were dried for 48 hours at 140° F. in a vacuum oven prior to capillary testing at a melt temperature of 220° C. Appropriate dwell times (10-90 sec) were selected, to ensure fully developed flow occurred at each shear rate. Melt strands were extruded into a water bath and collected at the following shear rates: 100, 500, 1000, 2500, 5000, and 8000 $sec^{-1}$.

Example 19

Example of the Invention

The polymer prepared in Example 6 was processed at a temperature of 220° C. (428° F.).

Example 20

Example of the Invention

The polymer prepared in Example 7 was processed at a temperature of 220° C. (428° F.).

Example 21

Example of the Invention

The polymer prepared in Example 9 was processed at a temperature of 220° C. (428° F.).

Example 22

Example of the Invention

The polymer prepared in Example 10 was processed at a temperature of 220° C. (428° F.).

Example 23

Comparative Example

The polymer prepared in Comparative Example 1 was processed at a temperature of 220° C. (428° F.).

Example 24

Comparative Example

The polymer prepared in Comparative Example 2 was processed at a temperature of 220° C. (428° F.).

Table 2, below, contains a summary of findings from the capillary extrusion testing of Examples 19-24. The data in Table 3 demonstrate that the examples of our invention are resistant to sharkskin at shear rates as high as 8000 sec$^{-1}$, which are well above the shear rates experienced by typical commercial processes.

TABLE 3

Sharkskin of Capillary Extrusions at Various Shear Rates

| Shear Rate (sec$^{-1}$) | Example 19 (Inv) | Example 20 (Inv) | Example 21 (Inv) | Example 22 (Inv) | Example 23 (Comp) | Example 24 (Comp) |
|---|---|---|---|---|---|---|
| CHDM (mole %) | 16.8 | 15.5 | 20.6 | 20.6 | 31 | 50 |
| Sharkskin Observed? | | | | | | |
| 100 | No | No | No* | No | No | No* |
| 500 | No | No | No | No | Yes | Yes |
| 1000 | No | No | No* | No | Yes | Yes* |
| 2500 | No | No | nr | nr | Yes | nr |
| 5000 | No | No | nr | nr | Yes | nr |
| 8000 | No | No | nr | nr | Yes | nr |

"nr" indicates no value was recorded
*See FIG. 1 for an image of this sample

Micrographs of the extrudate of Examples 21 and 24 were taken using an optical microscope to visually observe whether sharkskin had occurred. FIG. 1 provides the micrographs of Examples 21 and Example 24. As depicted in FIG. 1, at shear rates of 100 sec$^{-1}$, both materials exhibited a clear appearance and smooth surface, indicating that at these conditions both materials are suitable for industrial processing. However, at higher shear rates (1000 sec$^{-1}$) the material of comparative Example 24 exhibited a hazy, irregular surface indicative of sharkskin. Such behavior significantly limits processing of clear parts. In contrast, the material of Example 21 remained glossy and smooth even at the higher shear rate of 1000 sec$^{-1}$.

The invention has been described in detail with reference to the embodiments disclosed herein, but it will be understood that variations and modifications can be effected within the spirit and scope of the invention.

What is claimed is:

1. An extrusion blow molded article comprising at least one polyester which comprises:
   (a) a dicarboxylic acid component comprising:
      (i) about 90 to about 100 mole % of terephthalic acid residues;
      (ii) about 0 to about 10 mole % of aromatic and/or aliphatic dicarboxylic acid residues having up to 20 carbon atoms; and
   (b) a glycol component comprising:
      (i) 77 to about 85 mole % ethylene glycol residues; and
      (ii) about 15 to 23 mole % residues of 1,4-cyclohexanedimethanol; and
      (iii) about 2 mole % or less of diethylene glycol;
   (c) at least one branching agent in the amount of 0.01 to 1.0 mole %;
   wherein the total mole % of the dicarboxylic acid component is 100 mole %, and
   wherein the total mole % of the glycol component is 100 mole %; and
   wherein the inherent viscosity of the polyester is from 0.50 to less than 0.75 dL/g as determined in 60/40 (wt/wt) phenol/tetrachloroethane at a concentration of 0.25 g/50 ml at 25° C.; and
   having a haze value of less than 5% at shear rates greater than 500 sec$^{-1}$ as measured by ASTM D1003, Method A.

2. The article of claim 1 wherein the branching agent is present in the amount of 0.1 to 0.6 weight % based on the total weight of the polyester.

3. The article of claim 1 wherein said polyester comprises 17 to 22 mole % 1,4-cyclohexanedimethanol.

4. The article of claim 1 wherein the inherent viscosity of the polyester is from 0.65 to 0.75 dL/g.

5. The article of claim 1 which comprises at least one additive chosen from colorants, mold release agents, phosphorus compounds, plasticizers, nucleating agents, UV stabilizers, glass fiber, carbon fiber, fillers, impact modifiers, or a mixture thereof.

6. The article of claim 1 which comprises a container.

7. The article of claim 1 which comprises a bottle.

8. An extrusion blow molded article comprising a blend comprising:
   (1) from about 1 weight % to about 25 weight % of at least one polyester which comprises:
      (a) a dicarboxylic acid component comprising:
         (i) about 90 to about 100 mole % of terephthalic acid residues;
         (ii) about 0 to about 10 mole % of aromatic and/or aliphatic dicarboxylic acid residues having up to 20 carbon atoms; and
      (b) a glycol component comprising:
         (i) 77 to about 85 mole % ethylene glycol residues; and
         (ii) about 15 to 23 mole % residues of 1,4-cyclohexanedimethanol; and
         (iii) about 2 mole % or less of diethylene glycol residues;
      (c) at least one branching agent in the amount of 0.01 to 1.0 mole %;
   (2) from 75 weight % to 99 weight % of PET post-consumer recycle;
   wherein the total mole % of the dicarboxylic acid component is 100 mole %, and
   wherein the total mole % of the glycol component is 100 mole %; and
   wherein the inherent viscosity of the polyester is from 0.50 to less than 0.75 dL/g as determined in 60/40 (wt/wt) phenol/tetrachloroethane at a concentration of 0.25 g/50 ml at 25° C.; and wherein said article has a sidewall haze value of less than 3%, when measured on a film 0.04 inches thick, as measured by ASTM D1003, Method A.

* * * * *